United States Patent [19]

Schroeder

[11] Patent Number: 4,494,174
[45] Date of Patent: Jan. 15, 1985

[54] WET-ELECTROLYTE CAPACITOR PACKAGE

[75] Inventor: Walter W. Schroeder, Williamstown, Mass.

[73] Assignee: Sprague Electric Company, North Adams, Mass.

[21] Appl. No.: 424,808

[22] Filed: Sep. 27, 1982

[51] Int. Cl.³ .............................. H01G 9/00; H05K 1/14
[52] U.S. Cl. ........................................ 361/433; 361/395
[58] Field of Search ............... 361/433, 395; 29/570; 339/131; 357/68

[56] References Cited

U.S. PATENT DOCUMENTS

| | | | |
|---|---|---|---|
| 2,298,441 | 10/1942 | Waterman | 361/433 |
| 2,671,126 | 3/1954 | Brennan | 174/50 |
| 3,255,387 | 6/1966 | Giacomello | 317/230 |
| 3,341,751 | 9/1967 | Clement | 317/230 |

Primary Examiner—John Gonzales
Assistant Examiner—Douglas S. Lee

[57] ABSTRACT

A printed-circuit-mountable wet-electrolyte capacitor is housed in a cylindrical can. A disc-shaped plastic cover is fitted in the open end of the can and has a through-terminal sealed therein to which the capacitor anode is electrically connected. Another such terminal, or the can, may serve as the cathode terminal. A groove in the periphery of the cover has a rubber o-ring. The o-ring is compressed by rolling and beading the can inwardly to effect a can/cover seal. Elongate metal pieces are held positioned by cavities provided near the periphery of the cover. The cover is fitted into the can and the elongate pieces are welded to the inner lip of the can to stop outward movement of the cover and to serve as mounting means to a printed circuit board.

6 Claims, 5 Drawing Figures

1

WET-ELECTROLYTE CAPACITOR PACKAGE

BACKGROUND OF THE INVENTION

This invention relates to a wet-electrolyte capacitor package having a means for mounting to a printed circuit board and more particularly to such a capacitor wherein elongate metal fastening means and the capacitor terminals extend from one end of the capacitor.

A wet electrolyte capacitor of the wound foil type is conveniently housed within a metal can-type container having an internal ledge adjacent its open end. The typical closure of the art utilizes a multilayer seal having a compressible member which is forcibly engaged against the inside wall of the container. Terminating means may include a tab from each electrode through a slot in the multilayer cover joining an externally mounted lead or connector. The sealing of the open end of the container is produced by rolling the lip of the container onto a metallic mounting ring to compress the cover against the internal ledge in the container, and the resilient member against the container wall. The mounting ring has ears that extend axially away from the container to be used as means for mounting the package and also sometimes as the cathode terminal(s).

A wet-electrolyte capacitor of the porous anode type is conventionally housed in a metal can, the open end of which is closed by an insulative cover or plug that may have a peripheral groove in which there is a resilient ring against which the can is rolled to compress the ring to provide the necessary seal. Such capacitors also have the lip of the can rolled over the cover to resist the tendency for the cover to be forced out under certain operating conditions that create internal pressures within the can. In such capacitors, the can serves as the capacitor cathode and a cathode lead is merely attached to the can end in the opposite direction from the anode lead that extends through and away from the cover. Thus there is provided an "axial leaded" capacitor. Axial leaded capacitors are usually mounted horizontally on a printed circuit board with their leads bent to enter printed circuit board holes, whereby they are electrically and mechanically connected to the board.

It is an object of the present invention to provide an improved low cost wet-electrolyte capacitor package.

It is a further object of this invention to provide such a package having metal stops that serve both to stop the cover within the can and to provide means for mounting the package to a printed circuit board.

It is a further object of this invention to provide a high density wet-electrolyte capacitor package wherein the capacitor section is only slightly smaller in diameter than is the inside diameter of the housing.

SUMMARY OF THE INVENTION

A wet-electrolyte capacitor package is comprised of a wet-electrolyte capacitor having an outer cylindrical metal can. The can has an open end in which there is fitted a plastic cover, generally of disc shape. An annular groove is formed at the periphery of the cover and a ring of resilient material is in the groove. One metal terminal is sealed in a hole in the cover and electrically connected to the capacitor anode inside the can. The terminal has a wire lead portion extending axially away from the can. At least three elongate metal pieces are affixed, preferably by welds, at seperate places to the inner lip of the can and are in abutment with the cover.

A package of this invention provides a simple low cost construction and is especially versatile in production for complying with a variety of mounting hole sizes and printed wiring board hole sizes. A variety of the simple inexpensive elongated metal pieces may be kept on hand for that purpose.

DESCRIPTION OF THE PREFERRED EMBODIMENTS

Figure 1:
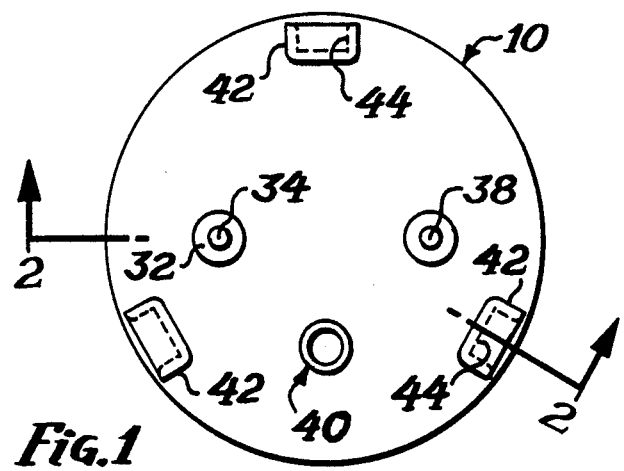
FIG. 1 shows in top view, a plastic cover.
Figures 2, 4, 5:
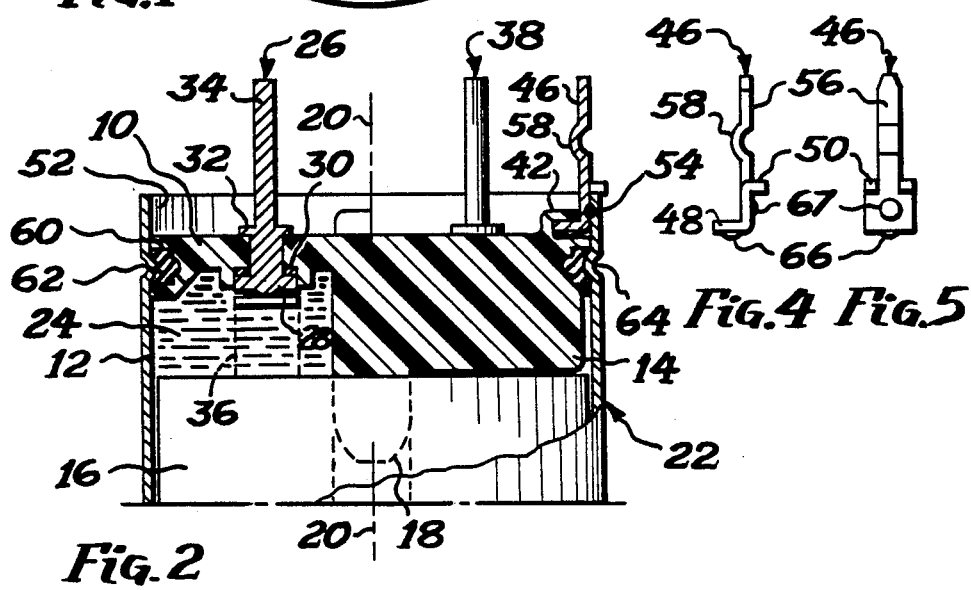
FIG. 2 shows in side sectional view a wet-electrolyte capacitor package of this invention including the cover of FIG. 1 taken in plane 2—2.
FIG. 4 shows in side view an elongate mounting piece of the package in FIG. 2.
FIG. 5 shows the mounting piece in a face view that is at right angles to the side view of FIG. 4.
Figure 3:
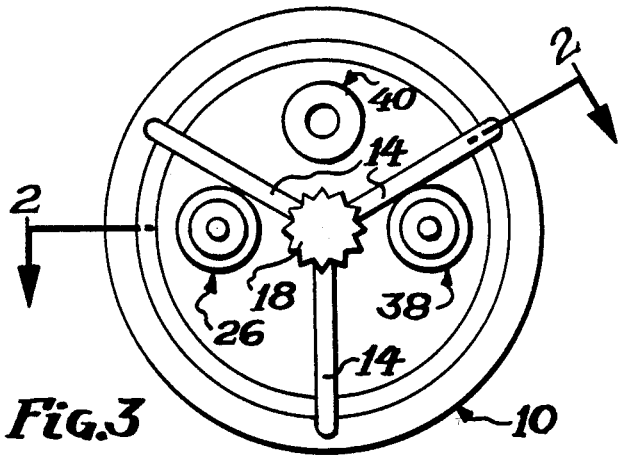
FIG. 3 shows in bottom view the cover of FIG. 1.

With reference to the FIGS. 1, 2 and 3, a generally disc-shaped plastic cover 10 is fitted into the open (top, as shown) end of a cylindrical metal can 12. Three fin portions 14 of the cover 10 extend toward the wound-foil-capacitor section 16. A central finger portion 18 of cover 20 extends along the axis 20 of the capacitor package 22 into the center hole of the section 16. The section 16 is submersed in a wet electrolyte 24.

A nail-head metal terminal 26 is fitted into a hole provided in the cover 10 with the nail-head portion 28 thereof sealing against a rubber o-ring 30. The terminal 26 is swaged in place from outside the terminal as indicated by the swaged ring portion 32. A wire lead portion 34 of the terminal 26 extends axially away from the package 22. A metal tab 36 from a foil of the capacitor section 16 is welded to the nail head portion 28 of the terminal 26. Another terminal 38, identical to terminal 26, is mounted in another region of the cover 10. Yet another region of the cover 10 contains a vent plug 40.

At each of three equidistant positions adjacent the periphery of cover 10 there is a raised mound portion 42 having an outward and radially facing cavity 44. Each of three elongate metal pieces 46, have a foot portion 48 that is inserted into one of the three mounds 42, respectively, as is illustrated in FIG. 2. The metal piece 46, shown in greater detail in FIGS. 4 and 5, has been punched from 0.020 inch (0.51 mm) thick sheet of tinned steel and bent as shown. The radially going tab portions 50 serves to stop the pieces 46 at a proper and uniform depth below the outer rim 52 of the can 12 prior to forming a weld 54 between a piece 46 and can 12. The tab 50 also serves as a "stand-off" so that the mounting pieces 46 cannot be inserted but so far into the printed wiring board holes. Thus a space between the board and the package 22 is assured for more reliable cleaning of solder fluxes from the board. The narrow axially directed portion 56 of piece 46 extends axially away from the can 12 for insertion in prearranged holes in a printed circuit board or the like. Such holes (not shown) are also normally provided to capture the leads 26 and 38 for electrical connection to the printed wiring. The narrow portions 56 are designed to provide reliable means for mounting the capacitor package 22 while the foot portion 48 stops any outward movement of cover 10 out of the can 12. The jog 58 in a central part of the axially directed portion of piece 46 provides a means for holding the capacitor package to the printed-circuit-board prior to a subsequent soldering step. The jog portion 58 is designed to distort while being pushed through a hole in the board and then exiting the other side snaps back to its original shape.

The cover 10 further includes an annular groove 60 at the cover periphery. Groove 60 contains a resilient ring of material 62. The can 12 has a corresponding inward facing circumferential ridge 64 pressing into the resilient ring 62 to effect a seal between cover 10 and can 12.

The procedure for assembling the package 22 is a relatively simple one capable of being accomplished by semiautomatic if not fully automatic means. One aspect of this procedure lending simplicity and leading to an efficient package is the use of a straight sided can into which a capacitor of nearly the same diameter may be assembled. Another significant feature is that the elongated mounting pieces take relative positions determined by holding cavities in the cover and themselves determine the position of the cover in the open end of the can. The assembly is described as follows:

Terminals 26 and 38 are threaded into a rubber o-ring 30, inserted into the cover holes and swaged. Another and much larger o-ring is placed into the peripheral groove 60 as the resilient material 62. The feet portions 48 of pieces 46 are slipped into cavity 44 of cover mounds 42. A bump 66 formed in foot 48 temporarily maintains the pieces 46 there temporarily through subsequent assembly steps. The capacitor section 16 is placed in the can 12 which is subsequentially almost filled with electrolyte 24. Alternatively, if a gel type electrolyte is used, the section will contain the gel before its placement in the can and the electrolyte filling step is omitted.

The cover 10 is then fitted into the open end of the can 12 until the tabs 50 of mounting pieces 46 stop against the outer rim 52 of the can 12. Each of the three mounting pieces 46 are then spot welded to the can rim 52 using a conventional capacitor discharge technique. A bump 67 is provided in the piece 46 to facilitate the welding. The can is then spun on its axis 20 while a tool is pressed against it at a location corresponding to the cover slot 60 to deform the can metal inwardly there and compress the resilient sealing o-ring 62.

Capacitor packages of this invention are suitable for housing a variety of wet-electrolyte capacitors, e.g. the type having a porous film-forming anode, usually tantalum, or the type having film-forming anode and cathode foils wound with a porous spacer therebetween. The former are usually made with low-viscosity-liquid electrolyes while the latter are usually made with a gelled electrolyte in the porous spacer. Since gelled electrolytes may become liquid at elevated temperatures and require a tightly sealed housing, a gel type electrolytes are considered here as wet electrolytes.

What is claimed is:

1. A wet-electrolyte capacitor package for mounting to a printed circuit board comprising:
   a cylindrical metal cam having one open end;
   a wet electrolyte combined within said can;
   an anodized film-forming anode covered by said electrolyte;
   a plastic cover of disk shape being fitted within the open end of said can;
   a seal between the periphery of said cover and can;
   a metal terminal being sealed in a hole provided therefor in said cover, said terminal having a lead portion extending away and in an axial direction with respect to said can, said anode being electrically connected to said terminal;
   at least three separate elongate metal pieces being affixed at separate locations to the inner lip of said can and extending in an axial direction away from said cover to serve as a means for said mounting, each of said separate elongate metal pieces having a foot portion that is bent radially inward and at right angles to said axial direction, each one of said foot portions being snugly fitted into an outward and radially facing cavity provided therefor in said cover near said cover periphery.

2. The capacitor package of claim 1 wherein said seal is comprised of a ring of resilient material being compressed in an annular groove in said cover periphery and against the inner wall of said can, said can having an inward-facing circumferential ridge portion pressing into said resilient material to effect said compression.

3. The capacitor package of claim 1 wherein said cover additionally includes at least three raised mound portions formed at the major outer surface of said cover near said periphery, each one of said cavities being formed in one of said mound portions.

4. The capacitor package of claim 1 additionally comprising welds for said affixing of said metal pieces to said can.

5. The capacitor package of claim 4 wherein each of said elongate metal pieces has a tab portion bent to extend radially and outwardly and resting against the outer lip of said can to serve both as a stop for the positioning of said pieces prior to their being affixed and as stand-offs for spacing said package away from said printed-circuit-board.

6. The capacitor package of claim 1 wherein each of said elongate pieces has in about the middle of the axially directed portion thereof a jog that may be distorted during insertion into a mounting printed-circuit-board hole and exiting the other side snapping and holding said package and printed-circuit-board together during a subsequent soldering step.

* * * * *